US005781320A

United States Patent [19]
Byers

[11] Patent Number: 5,781,320
[45] Date of Patent: Jul. 14, 1998

[54] FIBER ACCESS ARCHITECTURE FOR USE IN TELECOMMUNICATIONS NETWORKS

[75] Inventor: Charles Calvin Byers, Aurora, Ill.

[73] Assignee: Lucent Technologies Inc., Murray Hill, N.J.

[21] Appl. No.: 701,926

[22] Filed: Aug. 23, 1996

[51] Int. Cl.$^6$ ............................... H04J 4/00; H04J 14/00
[52] U.S. Cl. .................. 359/123; 359/135; 359/163; 359/139; 370/395; 370/905; 370/907
[58] Field of Search ........................... 359/123, 118, 359/125, 133, 137, 139, 152, 164, 167, 163, 173; 370/535–537, 539, 542, 395, 905, 907

[56] References Cited

U.S. PATENT DOCUMENTS

| | | | |
|---|---|---|---|
| 5,029,333 | 7/1991 | Graves et al. | 370/490 |
| 5,568,300 | 10/1996 | Ishihashi | 359/137 |

OTHER PUBLICATIONS

"OPTOBUS™", Manufacturer's Brochure, BR1459/D, Rev. 1, Motorola, printed Jun. 1996, 10 pp.

Primary Examiner—Kinfe-Michael Negash
Attorney, Agent, or Firm—Dennis J. Williamson

[57] ABSTRACT

A fiber optic access architecture consisting of a remote terminal for receiving broadband asynchronous transfer mode (ATM) traffic from a broadband switching system is disclosed. The broadband traffic is delivered over a pair of OC-12 links to common elements of the remote terminal. The common elements deliver the traffic to one of two high speed ATM buses. The ATM buses deliver the ATM traffic to one of a plurality of line cards that interface with the customer drop to the customer premise equipment. The line cards can include POTS (plain old telephone service) line cards and special line cards as are known to provide the traditional voice and special service. In addition to the standard line cards, the system includes the fiber line cards of the invention for delivering high speed, broadband traffic to the customer premise. The fiber line cards include 16 bit cell-based UTOPIA-2 bus interface for receiving traffic from each of the ATM buses. The UTOPIA interfaces deliver the ATM traffic to one of a plurality of ATM/SONET optical transceivers. Each optical transceiver consists of a 12 channel OC-1 physical layer framer that contains a 2-cell (106 byte) FIFO buffer to buffer the data upon arrival from the UTOPIA-2 interfaces. The framer performs SONET framing, pointer generation and scrambling for transmission. In the downstream direction, the framed SONET signals are delivered to a 12 channel laser driver and twelve lasers for transmitting the signals to the customer premise. In the upstream direction, the ATM cells are received from the customer premise at optical receivers such as photodiodes and are delivered to the UTOPIA interfaces via the framers. At the customer premise a video decoder card, POTS line card and/or a personal computer receive the signals over a passive bus.

11 Claims, 5 Drawing Sheets

FIBER ACCESS ARCHITECTURE FOR USE IN TELECOMMUNICATIONS NETWORKS

CROSS REFERENCE TO RELATED APPLICATION

This application is related to the application of Charles C. Byers entitled "Improved Customer Premise Equipment For Use With A Fiber Access Architecture In A Telecommunications Network" which application is assigned to the assignee of he present application, and is being filed concurrently herewith.

BACKGROUND OF THE INVENTION

The invention relates, generally, to the outside distribution plants of telecommunications networks and, more particularly, to an improved fiber technology access architecture.

It will be understood that the typical telecommunications network consists of a plurality of switching systems connected to one another for transmitting signals therebetween. Customer premise equipment (CPE) such as telephone stations, multimedia equipment, personal computers and the like are connected to selected ones of the switching systems via the outside distribution plant. The switching systems hosting the CPE are commonly referred to as central office switches. The switching systems route and transmit the signals between the CPE thereby allowing communication between different CPE in the network.

The outside distribution plant of a telecommunications network comprises those network elements that connect the central office switch to the CPE. The typical outside distribution plant includes a customer line that connects the central office switch to the customer premise and may include a remote terminal such as a digital loop carrier, a broadband distribution element or the like. The customer line has typically consisted of a twisted copper wire pair for transmitting voice to the customer premise.

While the twisted copper wire pair customer line adequately supports relatively low speed narrowband voice traffic, it is inadequate for high speed broadband traffic such as data, digital video and the like. Accordingly, high speed broadband access architectures have been developed to support these high speed applications. Existing broadband architecture includes digital subscriber loop (DSL), hybrid fiber coax (HFC) and switched digital video (SDV). While these broadband architectures provide relatively large bandwidth, they suffer from a number of shortcomings. For example, these architectures are asymmetrical such that while the bandwidth available in the central office to customer premise direction is relatively large, the bandwidth available in the customer premise to central office direction is much more limited. Moreover, the SDV architecture supports only relatively short (i.e., 900 feet) customer drops extending from the remote terminals to the customer premise. As a result, it is necessary to provide numerous, closely spaced remote terminals to provide adequate coverage in densely populated areas. Finally, the cost of the existing architectures is relatively expensive on a per line basis.

In an attempt to overcome these shortcomings, the telecommunications industry is moving towards a fiber optic access architecture to support high speed, broadband service. While the industry has recognized a need for such an access architecture, a relatively inexpensive, efficient and reliable fiber optic access architecture has not been developed.

Thus, a need exists in the telecommunications art for a low cost, efficient and reliable fiber access architecture.

SUMMARY OF THE INVENTION

The fiber optic access architecture of the invention consists of a remote terminal for receiving broadband asynchronous transfer mode (ATM) traffic from a broadband switching system and delivering it to customer premise equipment (CPE). It is contemplated that the broadband traffic will be delivered over a pair of OC-12 links to common elements of the remote terminal. The common elements deliver the traffic to one of two 622 megabits per second (Mbps) ATM backplane buses. The ATM buses deliver the ATM traffic to one of a plurality of line cards that interface with the customer drop to the customer premise equipment. The line cards can include POTS (plain old telephone service) line cards, ISDN line cards, coin line cards, and special line cards as are known to provide the traditional voice and special service. In addition to the standard line cards, the system includes the fiber line cards of the invention for delivering high speed, broadband traffic to the customer premise. The fiber line cards include a duplicated pair of broadband bus interfaces that connect the broadband bus of the backplane to an onboard bus. From the onboard bus the downstream data is directed through four ATM traffic shaping and policing chips to four sets of optical transceivers. For purposes of this application the downstream direction is defined as the direction from the broadband switching system to the CPE and the upstream direction is defined as the direction from the CPE to the broadband switching system. The optical transceiver modules consist of a set of twelve SONET ATM framer chips which drive a twelve channel laser driver and twelve lasers which directly drive the twelve downstream fibers. The SONET ATM framer chips also include ATM cell steering logic, 12 two-cell (106 byte) FIFO buffers to store the arriving data, and perform SONET framing, pointer generation and scrambling for transmission functions.

In the upstream direction, the twelve fibers extending from the customer premises arrive at twelve photodiodes on the optical transceiver. The resulting electrical signal is processed by twelve channels of preamplification and clock recovery circuitry and then is directed to the SONET ATM framer chip. In the upstream direction, the twelve channel SONET ATM framer chip performs SONET framing, ATM cell delineation and two cells (106 bytes) of buffering on each of the twelve channels. The ATM streams from the twelve channels are combined onto a single UTOPIA bus which is sent back through the ATM policing and traffic shaping chipset through to the backplane interfaces and onto the backplane buses.

At the customer premise the ATM cells can be delivered to a personal computer, video decoder and/or POTS telephone service line card. The system of the invention provides 48 channels, bidirectional bandwidth with a range of up to 5 kilometers at 51.84 Mbps data rate per channel in each direction per line card.

DETAILED DECRIPTION OF THE INVENTION

Figure 1:
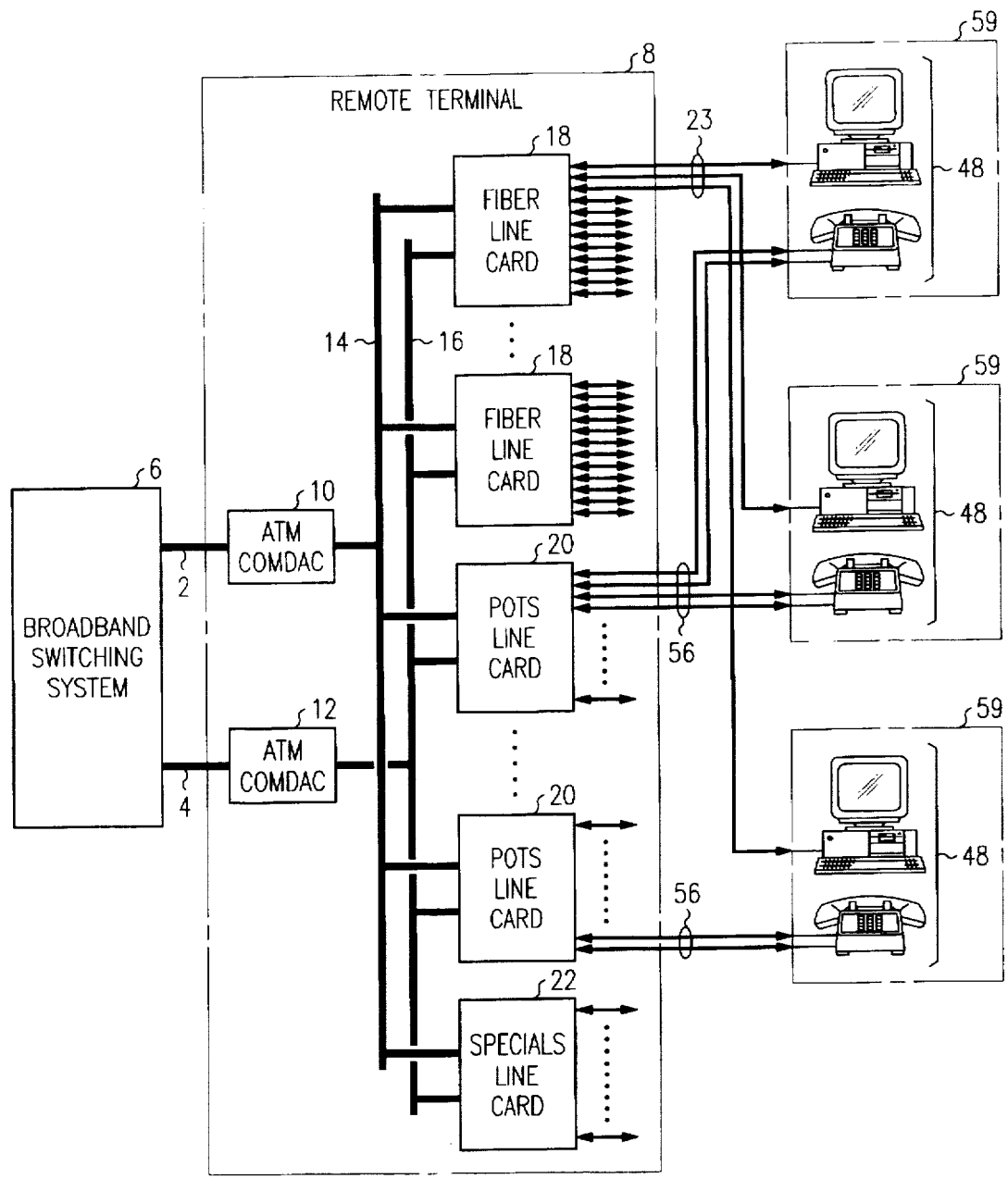
FIG. 1 is a block diagram of the fiber access architecture of the invention.

Referring more particularly to FIG. 1, the fiber access architecture of the invention consists of a first OC-12 link 2 and a second OC-12 link 4 connecting a broadband switching system 6, such as the Globeview® BSS broadband switch manufactured and sold by Lucent Technologies Inc., to remote terminal 8. The broadband switching system 6 transmits asynchronous transfer mode (ATM) signals that are defined by fixed-size cells consisting of a 48 byte payload and a 5 byte header that contains address information and error detection as is known in the art. Remote terminal 8 includes first ATM common elements 10 connected to the first link 2 and second ATM common elements 12 connected to the second link 4. The common elements function to terminate the links 2 and 4 and drive the broadband backplane 14 and 16 as is known in the art. Common elements 10 and 12 deliver the ATM signals to the first and second ATM buses 14 and 16, respectively. It is contemplated that the ATM buses 14 and 16 will operate at a data rate of 1.0 gigabits per second (Gbps) each. In the downstream direction, the ATM cells are delivered from the buses 14 and 16 to one of a plurality of line cards based on the ATM cell header address as is known in the art. The line cards include fiber line cards 18 for delivering high rate broadband traffic to the customer premise over fiber transmission media 23 as will hereinafter be described; POTS line cards 20 or ISDN or coin line cards (not shown) for delivering of narrowband voice signals to the CPE over twisted copper wire 56; and special line cards 22 for providing special services such as data port, DC alarm, and other special services. Other types of line cards can also be provided, if desired.

Figure 2:
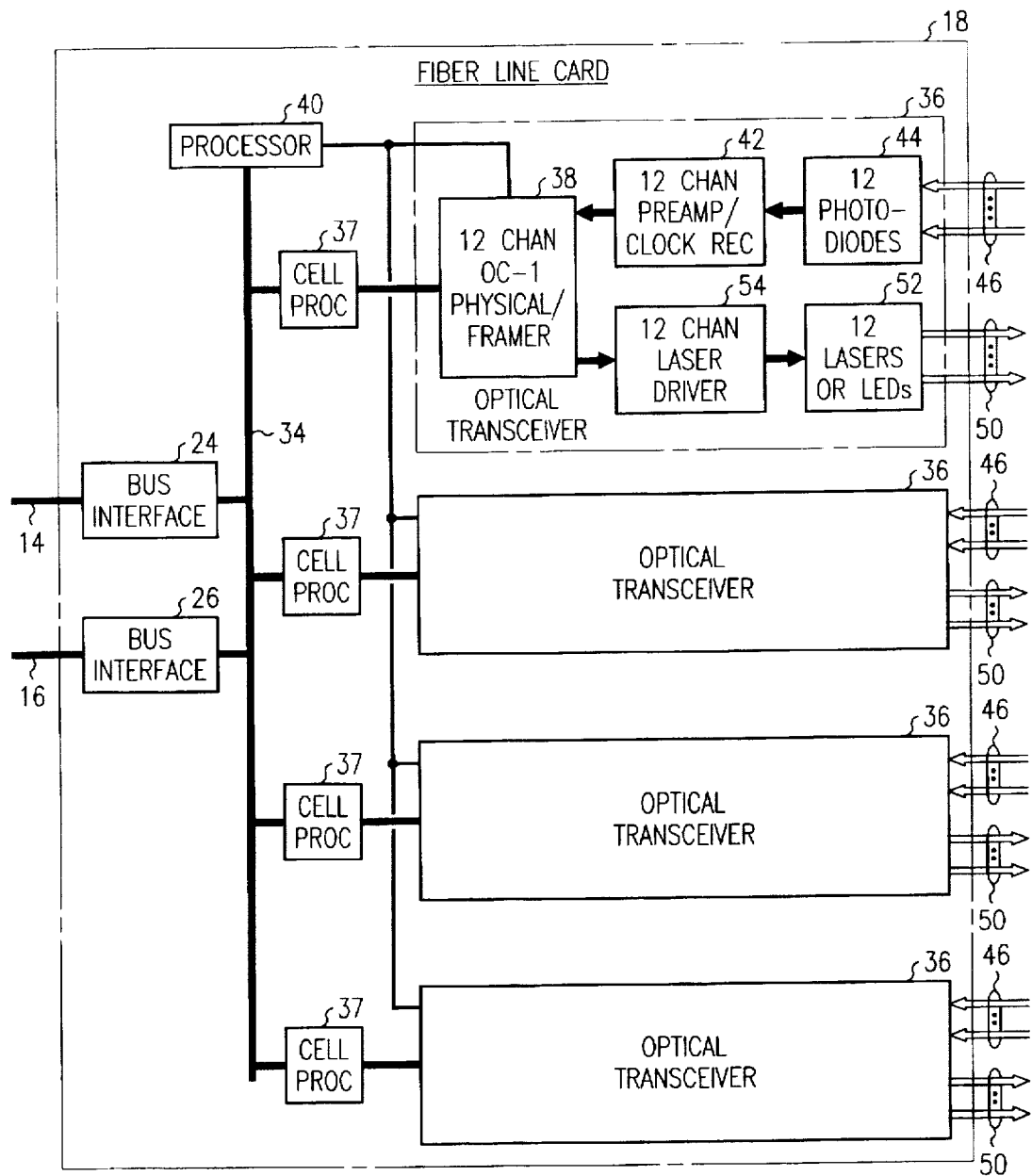
FIG. 2 is a more detailed block diagram of the fiber line card of FIG. 1.

The fiber line card 18 is shown in greater detail in FIG. 2 and consists of a first UTOPIA-2 bus interface 24 and a second UTOPIA-2 bus interface 26 connected to the ATM common elements of remote terminal 8 via broadband backplane buses 14 and 16, respectively. The UTOPIA bus interfaces 24 and 26 deliver the ATM cells to a local UTOPIA bus 34 that delivers the ATM cells to one of a plurality of ATM/SONET optical transceivers 36. Cell processing chips 37 are provided for traffic shaping, policing, ATM address translation for each of the optical transceivers.

The OC-1 data streams are created under the control of processor 40 that manages the initialization and operations of all OC-1 links on the line card. Each transceiver 36 consists of a twelve channel OC-1 physical interface and framer 38 that contains a 2-cell (106 byte) FIFO buffer to store data upon its arrival from bus 34. In the downstream direction, the framer 38 splits and frames the UTOPIA-2 bus data arriving from bus 34 into twelve separate OC-1 data streams. The framer 38 also performs pointer generation and scrambling for transmission and generates idle cells when the FIFO buffer is empty. In the upstream direction, the framer 38 reverses the process and combines the 12 OC-1 signals from the customer premise into a single UTOPIA-2 signal for delivery to bus 34.

The twelve OC-1 rate signals from framer 38 are delivered to the 12 channel laser driver 54 which drive twelve lasers or LEDs 52. The lasers or LEDs drive the signals over twelve OC-1 fibers 50 to the customer premise equipment 48 at a bit rate of 51.84 Mbps. Optical transceiver 36 is capable of transmitting the signal up to five kilometers, a distance comparable to the transmission distance of voice over a twisted wire pair. It is further contemplated that the twelve channel framer 38 be replaced by a four channel framer that creates four OC-3C data streams where each data stream operates at a 155 Mbps data rate, or a single channel framer creating a single OC-12C data stream, if desired. It will be appreciated that the line card of the invention 18 can include a plurality of optical transceivers 36 as illustrated with the transceivers delivering any combination of OC-1, OC-3C and OC-12C data streams.

A second set of twelve fibers 46 extending between each of the customer premise equipment 48 and the optical transceiver 36 transmits traffic in the upstream direction from the CPE to the transceiver. Fibers 46 terminate at twelve photodiodes 44. The photodiodes 44 deliver the traffic to a twelve channel preamp and clock recovery circuit 42, as is known in the art, and delivers the twelve OC-1 data streams to the framer 38 where they are recombined into a single UTOPIA-2 data stream for delivery to bus 34. While the invention has been described using separate fibers to handle transmission of signals between the remote terminal 6 and the CPE in the upstream and downstream directions, it will be appreciated that a single bi-directional fiber can also be used with either wavelength division multiplexing or time division multiplexing combining the signals in the upstream and downstream directions.

Figure 4:
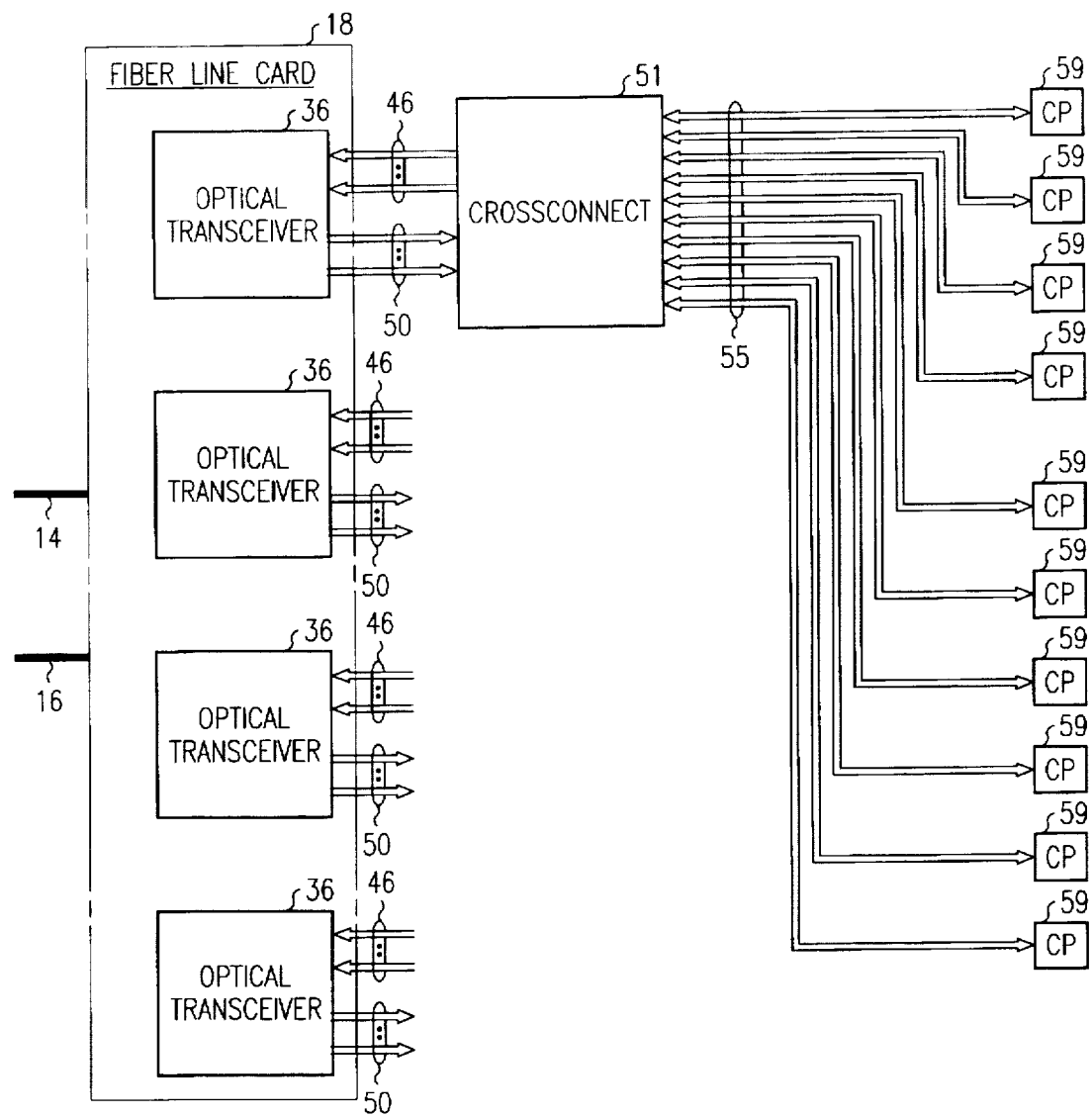
FIG. 4 is an alternate embodiment of the fiber access arrangement of FIG. 1.

Because it is expected that not all customer premises will require broadband service simultaneously the resources to the fiber line card 18 can be more efficiently utilized by using crossconnect 51 as shown in FIG. 4. Specifically, crossconnect 51 has inputs communicating with each of fibers 46 and 50 from fiber line card 18. Crossconnect 51 includes multiple times as many outputs connected to fibers 55 that extend to the customer premises 59. In the preferred embodiment the ratio of outputs to inputs is 4:1. It is to be understood that each line 55 in FIG. 4 represents both an upstream and a downstream fiber. Crossconnect 51 is capable of connecting any input to any output such that any one of the fibers 46 and 50 can be connected to any of the fibers 55. This arrangement allows the broadband service of the invention to be selectively delivered to any one of the connected customer premises without dedicating network resources, i.e. a specific fiber output from the optical transceiver, to that customer premise.

Referring again to FIG. 1, each customer premise receives one OC-1 channel over optical transmission numbers 23, consisting of fibers 46 and 50, and two twisted wire pairs 56 from the POTS line card 20. The OC-1 channel provides large bandwidth, high data rate service while the twisted wire pair provides standard telephony service. It will be appreciated, however, that the OC-1 channels can support voice telephony service and that the number of customer lines provided to each customer premise is by way of example only.

Figure 3:
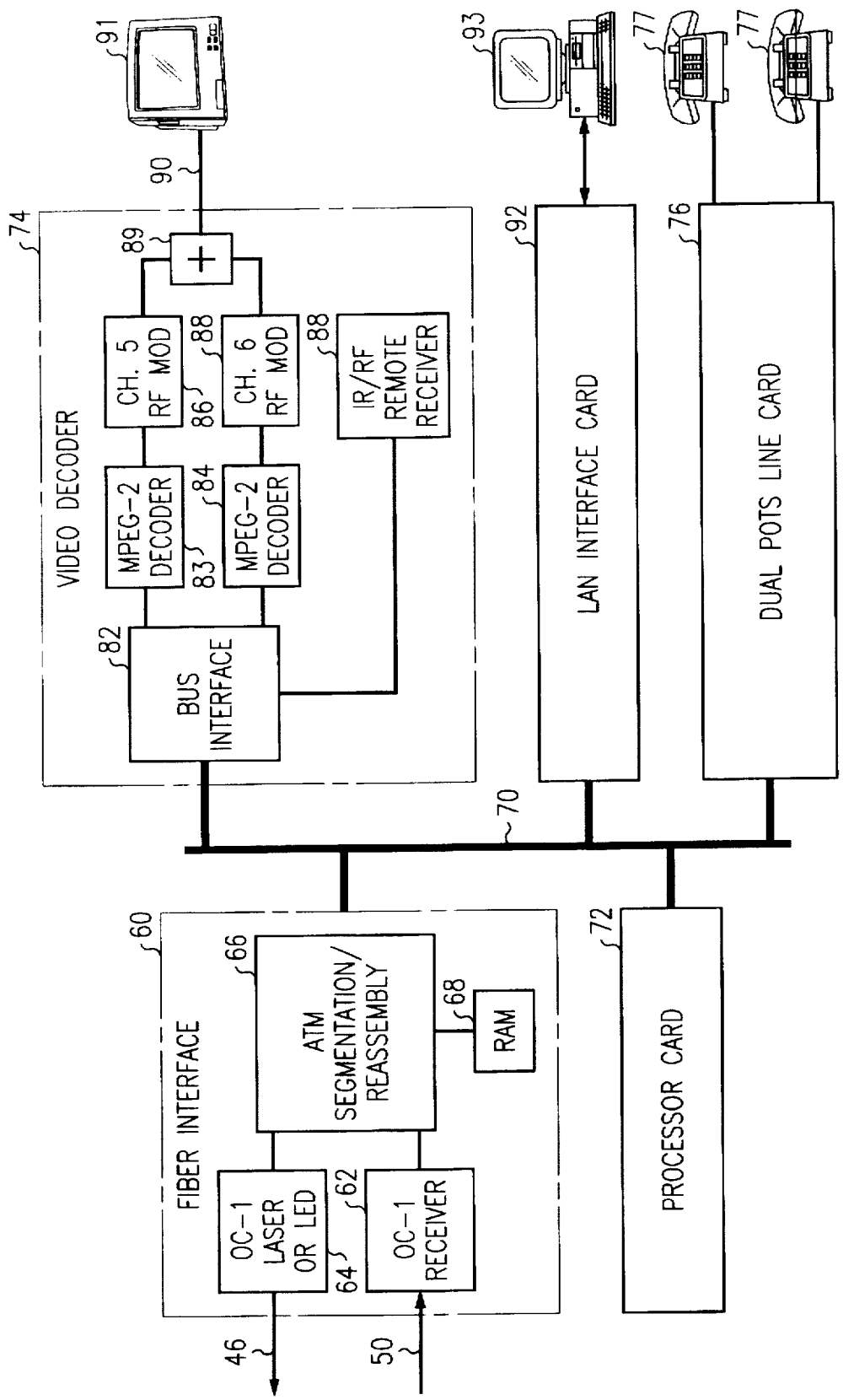
FIG. 3 is a more detailed block diagram of the customer premise equipment of FIG. 1.

Referring more particularly to FIG. 3, the customer premise equipment connected to the OC-1 channel is shown in greater detail. The customer premise equipment consists of a fiber interface 60 including an OC-1 receiver 62 for receiving downstream traffic from fiber 50. An OC-1 transmitter 64 such as a laser or LED is also provided for transmitting traffic in the upstream direction over fiber 50. Both the transmitter 64 and receiver 62 are connected to an ATM segmentation/reassembly circuit 66 such as the Motorola MC92516 ATM segmentation and reassembly controller. RAM 68 controls the operation of segmentation/reassembly circuit 66 to provide SONET framing, cell delineation, ATM adaptation layer control and standard personal computer interface (PCI). Other backplane interfaces than PCI can be used if desired. If OC-3C or OC-12C signal streams are received from the fiber line card 18, then an OC-3C or OC-12C receiver and an OC-3C or OC-12C laser driver would be used in place of receiver 62 and laser driver 64, respectively.

If the customer desires only data and has a personal computer with a free personal computer backplane interface such as a personal computer interface (PCI) slot, the fiber interface 60 can be connected directly to the personal computer for transmitting data directly thereto. If the customer desires digital video and/or telephony service over fiber or has no free PCI slot in the computer, the fiber interface 60 interfaces with a passive bus 70 such as a PCI bus. Bus 70 delivers the segmented signal either to the LAN interface card 92, a PCI MPEG-2 video decoder 74 for digital video and/or PCI dual POTS line card 76. A processor card 72 is provided to perform signal processing as is known in the art.

POTS line card 76 hosts two POTS lines connected to telephones 77 for telephony service. POTS line card 76 receives ATM cells from bus 70 and converts them to 64 kbps channels for delivery to telephones 77. It is intended that the telephony service provided by line card 76 be secondary service. Should the line card 76 support primary life line service, a battery backup power supply or power feed from the remote terminal would be used to ensure continuation of service during a power outage.

The video decoder 74 includes a bus interface 82 that delivers digital video to one of two MPEG-2 decoders 83 and 84. The MPEG- decoders finction to receive ATM cells and decompress those cells and create standard audio and video signals. The decoded signals are delivered to a channel 5 RF modulator 86 and a channel 6 RF modulator 88, respectively. The signal can then be delivered to the customer's television sets 91 via any suitable transmission media such as cable 90. Stereo Audio channels are decoded in parallel with the video MPEG decoding. Also, an infrared or RF remote receiver 89 is provided to allow remote control.

Figure 5:
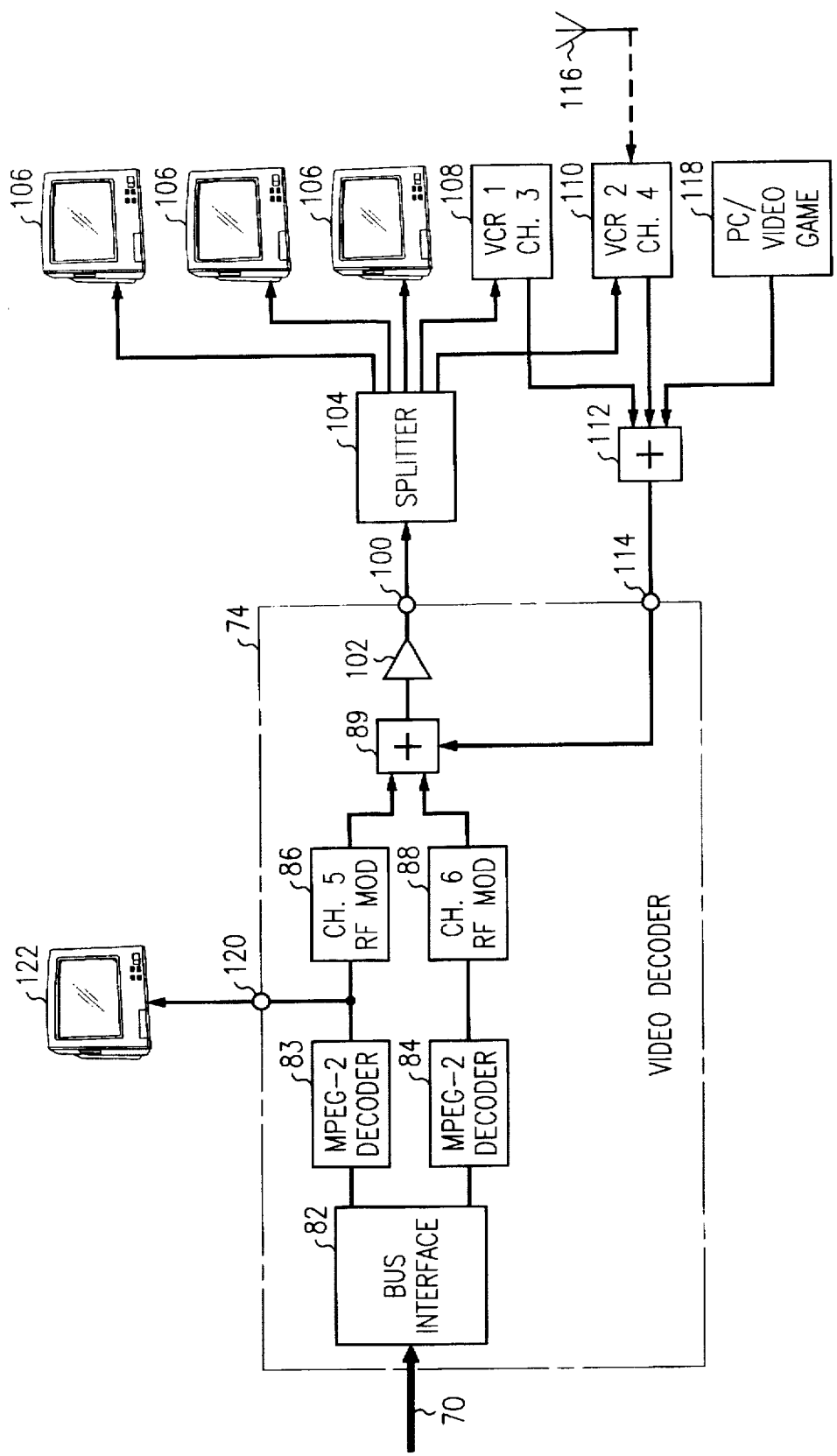
FIG. 5 is an alternate embodiment of the video system shown in FIG. 3.

An alternate embodiment of the video decoder 74 and associated video system is shown in FIG. 5 consisting of the bus interface 82, MPEG-2 decoders 83 and 84, and channel 5 RF modulator 86 and channel 6 RF modulator 88 connected to two inputs of combiner 89. Located between combiner 89 and external connector 100 is amplifier 102. External connector 100 is connected to a splitter 104 that delivers the signal to a plurality of televisions or monitors 106 and the RF inputs of a first video cassette recorder (VCR) 108 and a second VCR 110. The channel 3 output of VCR 108 and the channel 4 output of VCR 110 are connected to combiner 112 that delivers the combined signal to external connection 114 of video decoder 74. External connection 114 is connected to the third input of combiner 89. Because the outputs of VCR 108, VCR 110, channel 5 modulator 86 and channel 6 modulator 84 all are connected to combiner 89, any of televisions 106 can be tuned to any one of the four video source (i.e. ch. 3, ch. 4, ch. 5 or ch. 6) to receive the output of VCR 108, VCR 110 or digital video on demand from either channel 5 or channel 6. Moreover, the RF input to one of VCRs 108 or 110 can be connected to an antenna 116 to provide an additional video source. The input of combiner 112 can also receive the channel 3 or channel 4 output of a personal computer or video game 118. The system of the invention provides an ensemble of video sources (channels) without the need for an RF switch in the customer premise. Finally, a connection from the video and audio outputs of the MPEG-2 decoder 83 can be extended to an external connection 120 for direct connection to television 122 to avoid the downstream system and provide higher quality audio/video to the customer.

The personal computer interface card 92 receives ATM cells off of the PCI bus 70 and converts them to standard packets using standard ATM adaptation layer processing. These packets are sent out in standard personal computer interface to a personal computer 93 in order to provide work at home and internet access services.

The fiber access architecture described above provides a symmetric 51.84 Mbps data rate over fiber optic point to point links at a distance of 5 km. Because this distance is consistent with the limits of twisted wire pair drops, the fiber access elements of the remote terminal can be provided consistently with the twisted wire pair elements such that it is not necessary to provide the numerous remote terminals as in the prior art fiber access architecture if such remote terminals are not otherwise desired. The robust nature of the architecture and its simplicity make it relatively inexpensive on a per line cost as compared to other know broadband access technologies.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A line card for use in a communications network switching system, comprising:

a bus for receiving a broadband signal in a downstream direction from a network element and for transmitting said broadband signal in an upstream direction, said broadband signal having a predetermined maximum bandwidth;

means for framing said broadband signals into a plurality of channels each channel comprising a signal having a bandwidth less than said predetermined maximum bandwidth in said downstream direction and for framing said plurality of channels into a signal having said predetermined bandwidth in the upstream direction;

means for transmitting the signals of said plurality of channels over fiber to customer premises; and a processor for controlling the creation of the channels.

2. The fiber access architecture according to claim 1, wherein the means for framing include a multichannel framer that creates a plurality of signal streams each having the same bandwidth.

3. The fiber access architecture according to claim 1, wherein the means for transmitting includes a laser for each of the signal streams for driving the signals onto said fiber.

4. The fiber access architecture according to claim 1, wherein said means for framing creates twelve OC-1 data streams.

5. The fiber access architecture according to claim 1, wherein said means for framing creates four OC-3C data streams.

6. The fiber access architecture according to claim 1 wherein said means for framing creates one OC-12C data stream.

7. The fiber access architecture according to claim 1, wherein said means for framing creates a combination of OC-1, OC-3C and OC-12C data streams.

8. The fiber access architecture according to claim 1, wherein said means for transmitting includes a crossconnect for connecting said plurality of signals to selected ones of a greater plurality of transmission members.

9. A fiber access architecture for use in a telecommunications network, comprising:

a broadband switching system for delivering a broadband signal in a downstream direction and for receiving said broadband signal in an upstream direction, said broadband signal having a predetermined maximum bandwidth;

a plurality of line cards for receiving said broadband signal in said downstream direction and for transmitting said broadband signal in an upstream direction, said line cards including:

means for framing said broadband signals into a plurality of signals each having a bandwidth less than said predetermined maximum bandwidths in said downstream direction and for framing said plurality of signals into a signal having said predetermined bandwidth in the upstream direction;

means for transmitting said plurality of signals over fiber between said means for framing and customer premises; and a processor for controlling the creation of said plurality of signals; and means located at said customer premises for receiving selected ones of said plurality of signals.

10. A line card for use in a communications network switching system, comprising:

a bus for receiving a broadband signal in a downstream direction from a network element and for transmitting said broadband signal in an upstream direction, said broadband signal having a predetermined maximum bandwidth;

a framer for framing said broadband signals into a plurality of channels each channel comprising a signal having a bandwidth less than said predetermined maximum bandwidth in said downstream direction and for framing said plurality of channels into a signal having said predetermined bandwidth in the upstream direction;

a laser for transmitting the signals of said plurality of channels over fiber to customer premises; and a processor for controlling the creation of the channels.

11. A fiber access architecture for use in a telecommunications network, comprising:

a broadband switching system for delivering a broadband signal in a downstream direction and for receiving said broadband signal in an upstream direction, said broadband signal having a predetermined maximum bandwidth;

a plurality of line cards for receiving said broadband signal in said downstream direction and for transmitting said broadband signal in an upstream direction said line cards including:

a framer for framing said broadband signals into a plurality of signals each having a bandwidth less than said predetermined maximum bandwidths in said downstream direction and for framing said plurality of signals into a signal having said predetermined bandwidth in the upstream direction;

a laser for transmitting said plurality of signals over fiber between said framer and customer premises; and a processor for controlling the creation of said plurality of signals; and an interface located at said customer premises for receiving selected ones of said plurality of signals.

* * * * *